United States Patent [19]
Kitazawa et al.

[11] Patent Number: 5,957,236
[45] Date of Patent: Sep. 28, 1999

[54] ELECTRIC STEERING ACTUATOR

[75] Inventors: Hirokazu Kitazawa; Kazuhiro Kishimoto; Yoshio Kakizaki; Yoshitaka Katashima; Takashi Kuribayashi; Hitoshi Suda, all of Saitama-ken, Japan

[73] Assignee: Honda Giken Kogyo Kabushiki Kaisha, Tokyo, Japan

[21] Appl. No.: 08/641,372

[22] Filed: Apr. 30, 1996

[30] Foreign Application Priority Data

May 1, 1995 [JP] Japan .................................. 7-131006

[51] Int. Cl.⁶ .............................. B62D 5/04; B62D 7/14
[52] U.S. Cl. ................................................. 180/444
[58] Field of Search .................................. 180/444–445, 180/443, 411–413, 429, 434

[56] References Cited

U.S. PATENT DOCUMENTS

| | | | |
|---|---|---|---|
| 5,086,861 | 2/1992 | Peterson | 180/445 |
| 5,135,067 | 8/1992 | Kahata et al. | 180/445 |
| 5,330,023 | 7/1994 | Miyashita et al. | |

*Primary Examiner*—Karen M. Young
*Assistant Examiner*—Raymond B. Johnson
*Attorney, Agent, or Firm*—Carrier, Blackman & Associates, P.C.; Joseph P. Carrier; William D. Blackman

[57] ABSTRACT

In an electric steering actuator comprising an electric motor having a hollow output shaft, a steering shaft passed through the hollow center of the output shaft of the electric motor, and a ball-screw mechanism provided between the output shaft and the steering shaft for converting the rotary movement of the output shaft into a longitudinal movement of the steering shaft, a rotation preventing mechanism is provided for preventing the rotation of the steering shaft around its axial line. The rotation preventing mechanism comprises a guide pin extending in the casing in parallel with the axial line of the steering shaft, and a fork member engaging the guide pin between two prongs thereof. Because the rotation preventing mechanism can be formed by using a guide pin made of a stock steel or other metallic member, such as a cold finished steel bar, the manufacturing cost can be reduced. Furthermore by using a fork member defining an open slot for engagement with the guide pin, the assembling process is simplified, thereby reducing the manufacturing cost. In particular, by interposing a plastic slider between the pin and the fork member, metallic noises are avoided, and a smooth operation is ensured at a low cost.

12 Claims, 3 Drawing Sheets

5,957,236

ELECTRIC STEERING ACTUATOR

TECHNICAL FIELD

The present invention relates to an electric steering actuator for use in an electric power steering system.

BACKGROUND OF THE INVENTION

In some applications, in particular the steering systems for the rear wheels of a four-wheel steering vehicle, electric steering actuators are favored because of their desirable power characteristics and compact and light-weight design. For instance, the electric steering actuator disclosed in U.S. Pat. No. 5,330,023 comprises an electric motor having a hollow output shaft, a steering shaft passed through the hollow center of the output shaft of the electric motor, and a ball-screw mechanism provided between the output shaft and the steering shaft for converting the rotary movement of the output shaft into a longitudinal movement of the steering shaft.

The ball-screw mechanism comprises a threaded section of the steering shaft, and a nut member which threadably engages with the threaded section of the steering shaft via steel balls so that the rotary movement of the nut member is converted into an axial movement of the steering shaft. The ball-screw mechanism inevitably transmits some torque from the nut member to the steering shaft, due to friction and other causes, and it is therefore necessary to restrict the rotary movement of the steering shaft around its axial line while permitting its axial movement. According to this previous proposal, a radial arm extending from the steering shaft is guided along a guide slot defined in the casing of the actuator.

However, if there is any significant play between the radial arm and the guide slot, a knocking noise is produced each time the direction of movement of the steering rod is reversed. Therefore, this guide mechanism is required to be substantially free from play, and machining of the radial arm and the guide slot must be carried out at a high precision. This complicates the manufacturing process, and increases the manufacturing cost.

BRIEF SUMMARY OF THE INVENTION

In view of such problems of the prior art, a primary object of the present invention is to provide an electric steering actuator which is suitable for compact design, and, in particular, which is provided with inexpensive means for restricting the rotation of the steering shaft around its axial line.

A second object of the present invention is to provide an electric steering actuator which produces little noise during operation.

According to the present invention, these and other objects can be accomplished by providing an electric steering actuator, comprising: an axially elongated casing; an electric motor including a stator received in the casing, and a rotor including a hollow rotor shaft rotatably supported in the casing; a steering shaft passed inside the hollow rotor shaft and having two ends projecting from axial ends of the casing, and an intermediate threaded section disposed inside the casing; a nut member coupled to the rotor shaft in a rotatably fast manner, and threadably engaged with the threaded section of the steering shaft; and rotation preventing means for preventing rotation of the steering shaft around an axial center line thereof while allowing axial movement of the steering shaft; the rotation preventing means comprising a guide pin extending in the casing in parallel with the axial line of the steering shaft, and a fork member engaging the guide pin between two prongs thereof.

Because the rotation preventing means can be formed by using a guide pin made of a stock steel or other metallic member, such as a cold finished steel bar, the manufacturing cost can be reduced. Furthermore by using a fork member defining an open slot for engagement with the guide pin, the assembling process is simplified, thereby reducing the manufacturing cost. In particular, by interposing a plastic slider between the guide pin and the fork member, metallic noises are avoided, and a smooth operation is ensured at a lost cost.

According to a preferred embodiment of the present invention, the guide pin is received in a recess provided in the casing at a first end thereof, and is received in another recess provided in an end cap member closing an axial end of the casing at a second end thereof. Thus, no additional or separate fastening means is required for securing the guide pin, and the assembling process is simplified.

Other objects, advantages and salient features of the invention will be apparent from the following detailed description which, when considered together with the annexed drawings, discloses presently preferred embodiments of the invention.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
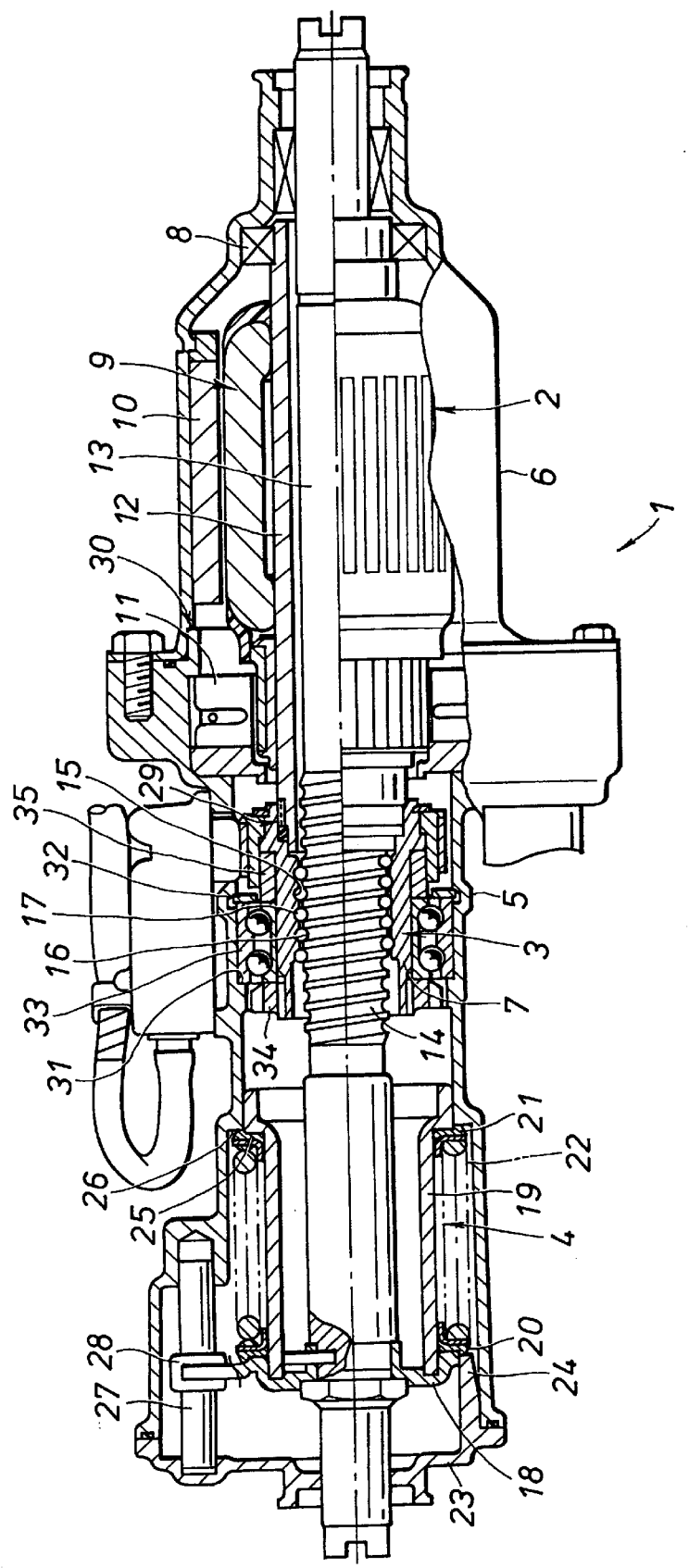
FIG. 1 is a longitudinal sectional via of a preferred embodiment of the electric steering actuator according to the present invention.

FIG. 1 shows an electric actuator constructed as an actuator for a power steering system, in particular for steering rear wheels in a four wheel steering vehicle, according to the present invention. This electric actuator 1 comprises a DC electric motor unit 2, a ball-screw unit 3, and a centering unit 4 for urging the actuator to a neutral position. The actuator 1 is received in a casing consisting of a first casing section 5 and a second casing section 6 which are joined with each other at axially mutually opposing ends thereof.

The DC electric motor unit 2 comprises a rotor 9, and a stator 10. The stator 10 consists of permanent magnet pieces securely attached to the inner circumferential surface of the second casing section 6. The rotor is provided with a hollow central shaft or a rotor shaft 12 having one end rotatably supported by the first casing section 5 via a nut member 7 of the ball-screw unit 3 and the other end rotatably supported by a bearing 8 secured to the second casing section 6. Thus, the rotor 9 is adapted to directly turn the nut member 7 in either direction by electric power supplied to the windings of the rotor 9 via a brush 11 supported by the first casing 5. The hollow central bore of the rotor shaft 12 coaxially receives a steering shaft 13 therein. The two ends of the steering shaft 13 project from respective axial ends of the casing, and are connected to associated tie rods (not shown in the drawings) via ball joints.

The ball-screw unit 3 comprises the nut member 7 which is provided with a threaded bore disposed coaxially with the inner bore of the rotor shaft 12, an external thread 14 provided in an intermediate part of the steering shaft 13, and steel balls 17 which are interposed between the threaded bore of the nut member 7 and the external thread 14 of the steering shaft 13. The steel balls 17 are received in screw grooves 15 and 16 of the internal thread and the external thread, respectively, each having a semicircular cross section.

The centering unit 4 comprises a disk 18 securely attached to an end of the steering shaft 13 remote from the electric motor, a sleeve 19, having one end securely attached to a peripheral part of the disk 18 and extending coaxially toward the ball-screw unit 3, and a compression coil spring 22 received in an annular space defined between the outer circumferential surface of the sleeve 19 and the inner circumferential surface of the first casing section 5. One end of the compression coil spring 22 abuts an axial projection 24 provided in an end cap 23 closing an open end of the first casing section 5 remote from the electric motor, and an outer periphery of the disk 18, via a first annular spring retainer 20. The other end of the compression coil spring 22 abuts an annular shoulder 25 defined in the outer circumferential surface of the free end of the sleeve 19 and an annular shoulder 26 defined in the inner circumferential surface of the first casing section 5 via a second annular spring retainer 21.

The steering shaft 13 is prevented from rotating around its axial line by a guide pin 27 secured to the first casing section 5 and the end cap 23 and extending in parallel with the steering shaft 13, and a cooperating fork member 28 which extends radially from the disk 18, and is engaged by the guide pin 27. Thereby, the steering shaft 13 is only allowed to move axially relative to the casing as the nut member 7 of the ball-screw unit 3 turns.

Thus, the rotation of the rotor 9 is converted into the longitudinal movement of the steering shaft 13 which in turn causes the rear wheels to be steered via tie rods not shown in the drawings.

When the steering shaft 13 moves leftward from the neutral position given in FIG. 1, the sleeve 19 along with the disk 18 fixedly secured to the steering shaft 13 moves leftward. As a result, the compression coil spring 22 is compressed between the annular shoulder 25 of the sleeve 19 and the axial projection 24 of the end cap 23, thereby urging the steering shaft 13 back to its neutral position. Conversely, when the steering shaft 13 moves rightward from the neutral position given in FIG. 1, the compression coil spring 22 is compressed between the annular shoulder 26 of the first casing section 5 and the outer periphery of the disk 18, again thereby urging the steering shaft 13 back to its neutral position. Thus, a fail-safe feature is achieved so that the steering shaft is urged to its neutral position in case the engine has stopped or the drive power to the electric motor is stopped.

Opposing ends of the nut member 7 and the rotor shaft 12 are engaged with each other by a coupling assembly 29 consisting of a serration coupling in this embodiment. This coupling assembly 29 allows an axial fitting or sliding connection between the two parts, but joins the two parts in a rotatively fast torque transmitting relationship. The opposing ends of the first casing section 5 and the second casing section 6 are provided with flanges, and are secured to each other by threaded bolts passed through holes provided in one of the flanges and threaded into holes provided in the other flange. In particular, the first casing section 5 is provided with an annular projection 30 which snugly fits into the inner bore of the opposing end of the second casing section 6. The annular projection 30 simply ensures a proper alignment between the two casing sections 5 and 6.

An angular ball bearing 33 is fitted into the inner bore of the first casing section 5, and is kept immobile in the axial direction by means of an annular shoulder 31 provided in the inner circumferential surface of the first casing section 5 and a stop ring 32. The nut member 7 is received in the inner bore of the inner race of the angular ball bearing 33, and the inner race of the bearing 33 is clamped between a collar 35 integral with the nut member 7 and a bearing nut 34 threadably engaged by the nut member 7 to keep the nut member 7 immobile in the axial direction. Therefore, the nut member 7 is supported so as to be immobile in the axial direction relative to the first casing section 5, but to be freely rotatable relative to the first casing section 5.

When assembling this actuator, first of all, the rotor 9 and the stator 10 are assembled into the second casing section 6 while all the remaining component parts are assembled into the first casing section 5. Then, with an end of the rotor shaft 12 aligned with the open end of the nut member 7, the first and second casing sections 5 and 6 are axially joined with each other, and are secured with each other by the threaded bolts passed through the flanges of these two casing sections. The axial position of the rotor shaft 12 is fixed at the other axial end thereof by the bearing 8 provided in the second casing section 6, and the nut member 7 and the rotor shaft 12 are axially coupled with each other by the serration coupling so as to be joined rotationally fast with each other.

Figure 2:
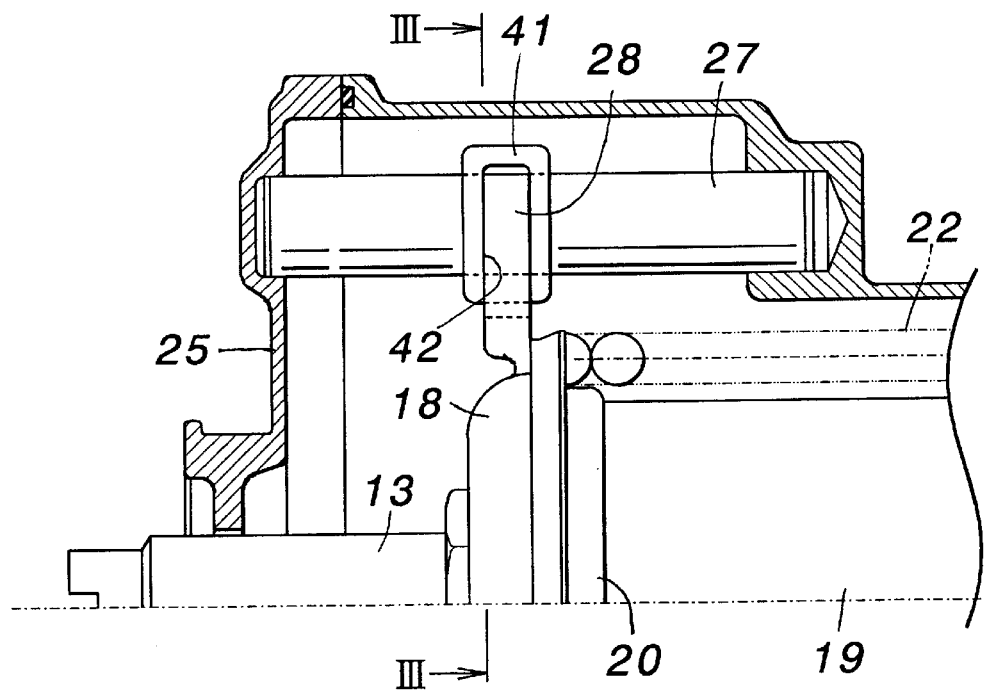
FIG. 2 is an enlarged view of a part of FIG. 1.
Figure 3:
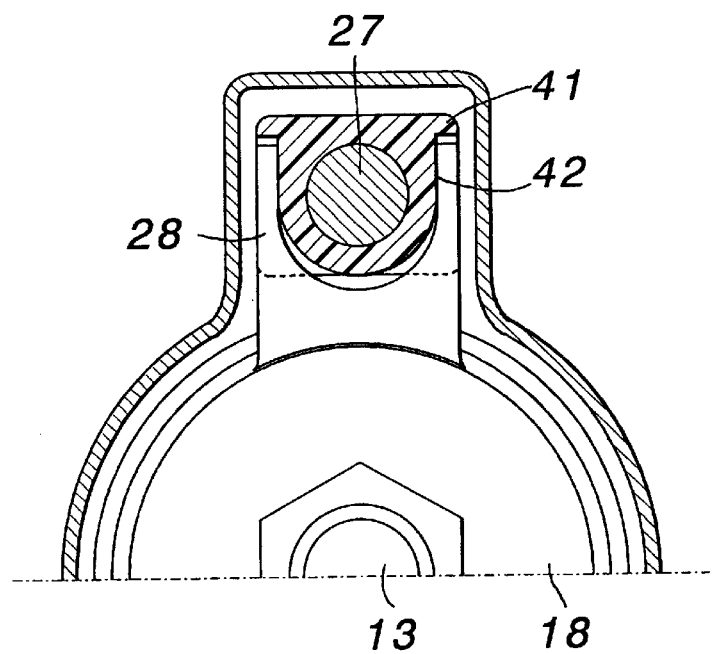
FIG. 3 is a sectional view taken along line III—III of FIG. 2.
Figure 4:
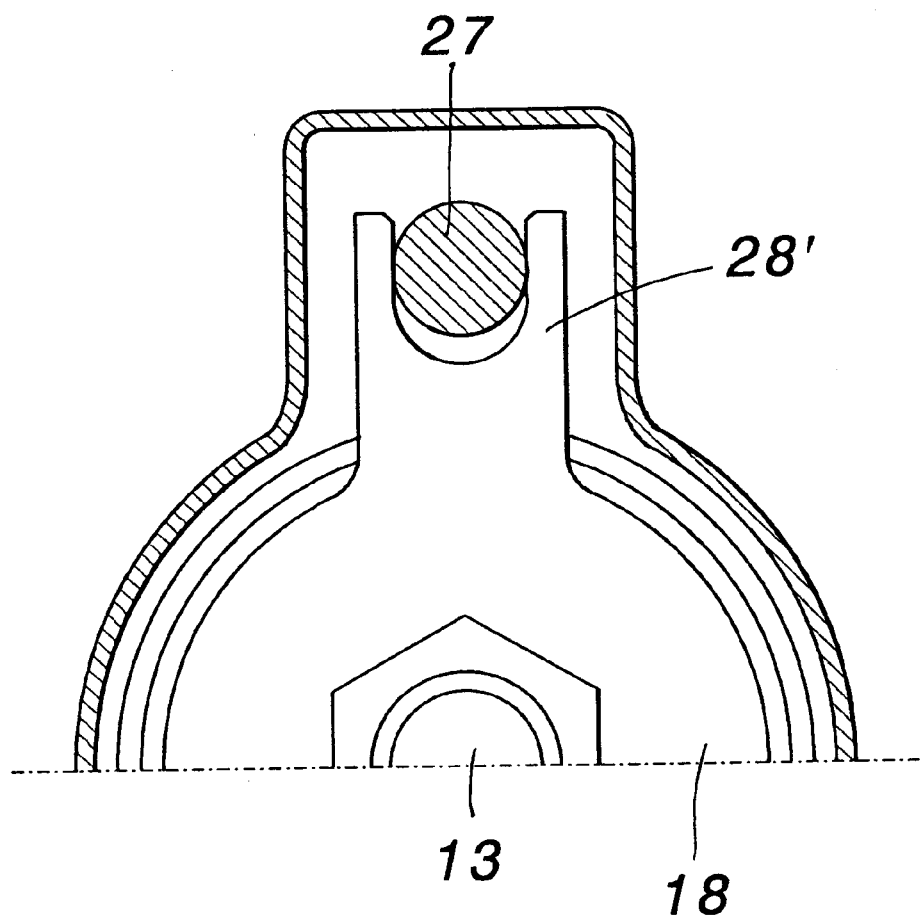
FIG. 4 is a sectional view similar to FIG. 3 showing another embodiment of the present invention.

The guide pin 27 may consist of a rod having a uniform cross section along its length, for instance a cold finished steel bar. The steel bar can be used simply by cutting it into a required length and chamfering both ends thereof. As the outer circumference of the guide pin 27 is not required to be machined, the manufacturing cost can be substantially reduced. As best illustrated in FIGS. 2 and 3, a slider 41 consists of a U-shaped block made of plastic material, and provided with a central bore which receives the guide pin 27 in a close fit. The lateral sides of the slider 41 are provided with grooves 42 for receiving the two prongs of the fork member 28. By thus engaging the fork member 28 with the guide pin 27 via the slider 41 made of synthetic resin material, generation of metallic noises is avoided, and a smooth operation is ensured. However, for the necessary function of this guide mechanism, the slider 41 is not essential, and can be omitted if desired. For instance, as illustrated in FIG. 4, the fork member 28' may be directly engaged by the guide pin 27 according to the second preferred embodiment of the invention. It will be apparent from the foregoing that the fork 28 or 28' is slidably movable with respect to the fixed guide pin 27. Accordingly, the fork 28, 28' may be referred to as a sliding member, whether or not the plastic slider 41 is used. As shown best in FIGS. 3 and 4, the relationship between the fork 28 or 28' and the guide pin 27 is such that the fork partially annularly surrounds a section of the guide pin.

Thus, according to the present invention, because the guide mechanism for preventing the rotation of the steering shaft can be formed by using a guide pin made of a stock steel or other metallic member, such as a cold finished steel bar, the manufacturing cost can be reduced. Furthermore by using a fork member defining an open slot for engagement with the guide pin, the assembling process is simplified, thereby reducing the manufacturing cost. In particular, by interposing a plastic slider between the guide pin and the fork member, metallic noises are avoided, and a smooth operation is ensured at a lost cost.

Although the present invention has been described in terms of preferred embodiments thereof, it is obvious to a person skilled in the art that various alterations and modifications are possible without departing from the scope of the present invention which is set forth in the appended claims.

What we claim is:

1. An electric steering actuator, comprising:

an axially elongated casing;

an electric motor including a stator received in said casing, and a rotor including a hollow rotor shaft rotatably supported in said casing;

a steering shaft passed inside said hollow rotor shaft and having two ends projecting from axial ends of said casing, and an intermediate threaded section disposed inside said casing;

a nut member coupled to said rotor shaft in a rotatably fast manner, and threadably engaged with said threaded section of said steering shaft; and rotation preventing means for preventing rotation of said steering shaft around an axial center line thereof while allowing axial movement of said steering shaft;

said rotation preventing means comprising a guide pin extending in said casing in parallel with said axial center line of said steering shaft, and a fork member guided by said guide pin between two prongs thereof.

2. An electric steering actuator according to claim 1, wherein said guide pin is received in a recess provided in said casing at a first end thereof, and is received in another recess provided in an end cap member closing an axial end of said casing at a second end thereof.

3. An electric steering actuator according to claim 1, wherein a slider made of synthetic resin material is slidably fitted on said guide pin, and said fork member engages said guide pin via said slider.

4. An electric steering actuator according to claim 1, further comprising:

centering means for urging said steering shaft toward a neutral position thereof, said centering means are disposed in said casing, and said fork member extends radially from said centering means.

5. An electric steering actuator according to claim 4, wherein:

said centering means include a disk securely attached to one said end of said steering shaft, and said fork member extends radially from said disk.

6. An electric steering actuator according to claim 1, wherein said fork member is operatively attached to said steering shaft and extends radially therefrom.

7. An electric steering actuator according to claim 6, wherein said fork member is attached to one of said two ends of said steering shaft remote from said electric motor.

8. An electric steering actuator comprising:

an axially elongated casing;

an electric motor including a stator received in said casing and a rotor including a hollow rotor shaft rotatably supported in said casing;

a steering shaft extending through said hollow rotor shaft and having opposite ends projecting from respective, axial ends of said casing;

a ball-screw means operatively coupling said rotor shaft to said steering shaft for transforming rotating movement of said rotor shaft to axial movement of said steering shaft; and rotation preventing means for preventing rotation of said steering shaft around an axial center line thereof while allowing axial movement of said steering shaft;

said rotation preventing means comprising a guide pin fixed in said casing parallel to said axial center line of said steering shaft, and a sliding member partially, annularly surrounding said guide pin for being guided thereby.

9. An electric steering actuator according to claim 8, wherein a first end of said guide pin is received in a recess provided in said casing, and a second end of said guide pin is received in another recess provided in an end cap closing an axial end of said casing.

10. An electric steering actuator according to claim 8, wherein said rotation preventing means further comprises a slider slidably fitted on said guide pin, and said sliding member engages said slider.

11. An electric steering actuator according to claim 8, wherein said sliding member is operatively attached to said steering shaft near one end thereof and projects radially from said steering shaft.

12. An electric steering actuator according to claim 8, further including centering means for urging said steering shaft toward a neutral position thereof, said centering means being disposed in said casing, and said sliding member extending radially from said centering means.

* * * * *

UNITED STATES PATENT AND TRADEMARK OFFICE
CERTIFICATE OF CORRECTION

PATENT NO. : 5,957,236
DATED : September 28, 1999
INVENTOR(S) : H. Kitazawa, et. al.

It is certified that error appears in the above-identified patent and that said Letters Patent is hereby corrected as shown below:

Column 2, line 30, change "via" to —view—.

Column 3, line 63, after "fast" insert a comma.

Column 5, line 2, change "lost" to —low—.

Signed and Sealed this

Second Day of May, 2000

Attest:

Q. TODD DICKINSON

Attesting Officer

Director of Patents and Trademarks